(12) United States Patent
Trogstam

(10) Patent No.: US 6,811,164 B2
(45) Date of Patent: Nov. 2, 2004

(54) SYSTEM FOR HANDLING ANIMAL CAGES IN RESEARCH LABORATORIES

(75) Inventor: Mikael Trogstam, Strangnas (SE)

(73) Assignee: Steris Inc., Temecula, CA (US)

( * ) Notice: Subject to any disclaimer, the term of this patent is extended or adjusted under 35 U.S.C. 154(b) by 1 day.

(21) Appl. No.: 10/292,554

(22) Filed: Nov. 12, 2002

(65) Prior Publication Data

US 2004/0090028 A1 May 13, 2004

(51) Int. Cl.$^7$ ................................................. B62B 1/00
(52) U.S. Cl. .................................. 280/79.3; 280/47.35
(58) Field of Search ........................... 280/79.3, 79.11, 280/79.4, 79.7, 79.2, 47.35, 47.34, 47.18, 47.19, 47.26, 47.27, 43.24, 87.01, 47.28, 47.33, 47.41; 211/184, 189, 41.1, 90.1, 70.6; 312/198

(56) References Cited

U.S. PATENT DOCUMENTS

| | | | | |
|---|---|---|---|---|
| D185,457 S | * | 6/1959 | Molitor | D14/3 |
| 3,199,683 A | * | 8/1965 | Graswich | 211/41.1 |
| 3,450,451 A | * | 6/1969 | Lyman, Jr. | 312/198 |
| 3,999,775 A | * | 12/1976 | Brongo | 280/79.2 |
| 4,068,855 A | * | 1/1978 | Hackett | 280/79.3 |
| 4,117,937 A | * | 10/1978 | Ratti | 211/70.6 |
| 4,165,088 A | * | 8/1979 | Nelson | 280/47.35 |
| 4,302,023 A | * | 11/1981 | Kiesz | 280/43.24 |
| 4,512,591 A | * | 4/1985 | Plante | 280/47.35 |
| 6,022,033 A | * | 2/2000 | Landesman et al. | 280/47.35 |
| 6,264,220 B1 | * | 7/2001 | Pierce et al. | 280/79.3 |
| 6,394,033 B1 | | 5/2002 | Trogstam et al. | 119/458 |
| 6,460,950 B2 | * | 10/2002 | Spitzer et al. | 280/79.11 |
| 6,581,788 B1 | * | 6/2003 | Winig et al. | 211/90.01 |

* cited by examiner

Primary Examiner—Brian L. Johnson
Assistant Examiner—Hau Phan
(74) Attorney, Agent, or Firm—Kusner & Jaffe; Michael A. Centanni

(57) ABSTRACT

A portable cart for use in a washing chamber for organizing and supporting articles to be washed. The cart is comprised of a generally rectangular, open frame structure comprised of a plurality of elongated structural members. A plurality of the structural members have apertures formed therein. Two planar panels are attached to the frame. The panels are spaced apart and have a plurality of apertures formed therethrough. A plurality of elongated rods are attached to and extend between the panels and are attached to the apertures. The rods define article support areas within the frame structure. One or more support elements are mounted through the apertures in the structural members or the panels. The support elements are dimensioned to support articles. Coasters at one end of the frame member allow rolling movement of the frame member.

14 Claims, 13 Drawing Sheets

SYSTEM FOR HANDLING ANIMAL CAGES IN RESEARCH LABORATORIES

FIELD OF THE INVENTION

The present invention relates generally to portable storage devices, and more particularly, to transport carts for handling animal cages in a research facility. The present invention is particularly applicable for use in systems for storing, washing and sterilizing cages and cage components for use in animal facilities, and will be described with particular reference thereto.

BACKGROUND OF THE INVENTION

It is not uncommon in large animal facilities to find thousands of cages containing small animals, such as rats, mice, guinea pigs and the like. Each cage is generally comprised of a plastic tray containing bedding material for the animal(s), a screen separator that is positioned over the tray, a lid covering the screen and tray, and a water bottle having a sipping tube. The water bottle is supported on the lid with the sipping tube extending into the cage. As will be appreciated, it is periodically necessary to transfer the animals to a new, clean (washed and sterilized) cage to maintain a proper living environment for the animal(s).

Replacing a dirty or soiled cage with a washed and sterilized cage requires assembling a cage from clean, sterilized cage components. In large animal facilities, the assembly of a clean cage generally takes place in the room where the animals are housed. The clean components are typically brought into the animal storage room on carts. The clean cage components are usually taken from the cart and assembled near or beside the soiled cage it is intended to replace. The clean components must include bedding material in the tray and water in the water bottle. The same cart that is carrying the clean cage component is often used to receive and transport components from the dirty, i.e., soiled, cage that is being replaced. In this respect, technicians loading and unloading items from these transfer carts must do so in a manner wherein the clean, sterilized cage components are not contaminated by contact with the soiled cage components.

Once the clean cage is assembled with bedding material, food and water therein, the animal is then transferred from the soiled cage to the clean cage, and the clean cage with the animal(s) therein is placed back to its initial position on a cage holding rack.

As indicated above, the soiled cage must be disassembled and the respective components washed and sterilized before they are reused. These items must of course be emptied of bedding material and residual fluid (i.e., water) before cleaning and sterilizing. It is known to utilize large industrial washing systems for washing the various cage components. It is also known to use robots to automatically dump waste material from cage trays, to empty water bottles and to place such components on conveyors for washing. To effectively wash large numbers of components, like components are organized on carts, on pallets, or in baskets that are designed to be placed within the aforementioned large washing and sterilizing units. At facilities having thousands of animals and thousands of cages, the logistics for quickly and efficiently replacing soiled cages with clean cages, as well as the process for handling and cleaning soiled cages, is of utmost importance.

Thus, there is a need to provide a means for storing, transporting and even washing dissimilar components of an animal cage in an efficient, organized manner. It is highly desirable to have a transport device that facilitates the easy exchange of clean and soiled items, and a transport device that is adaptable for use in a variety of types of automated systems. Still further, the transport device must be compatible and easily used in conventional, industrial washing and sterilizing units.

The present invention provides a transfer cart for use in supporting and transferring cage components of an animal cage for use in an animal storage facility.

SUMMARY OF THE INVENTION

In accordance with a preferred embodiment of the present invention, there is provided a portable cart for organizing, supporting and transporting articles. The cart is comprised of a generally rectangular, open frame structure comprised of a plurality of elongated structural members. A plurality of the structural members have apertures formed therein. The cart includes two planar panels that are spaced apart and have a plurality of apertures formed therethrough. A plurality of elongated rods that are attached to and extend between the panels, the rods being attached to the panels using said apertures. The rods define article support areas within the frame structure. One or more support elements are mounted through the apertures in the structural members or the panels. The support elements are dimensioned to support articles. Coasters at one end of the frame member allow rolling movement of the frame member.

An advantage of the present invention is to provide a transfer cart that facilitates efficient and easy handling of cage components in an animal storage facility.

Another advantage of the present invention is to provide a transfer cart that is adaptable to support components in a number of different ways, and is adaptable to support components of different sized animal cages.

Another advantage of the present invention is to provide a transfer cart that is usable to support cage components in a washer and/or sterilizer system.

A still further advantage of the present invention is to provide a transfer cart that finds advantageous application with automated robotic systems.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
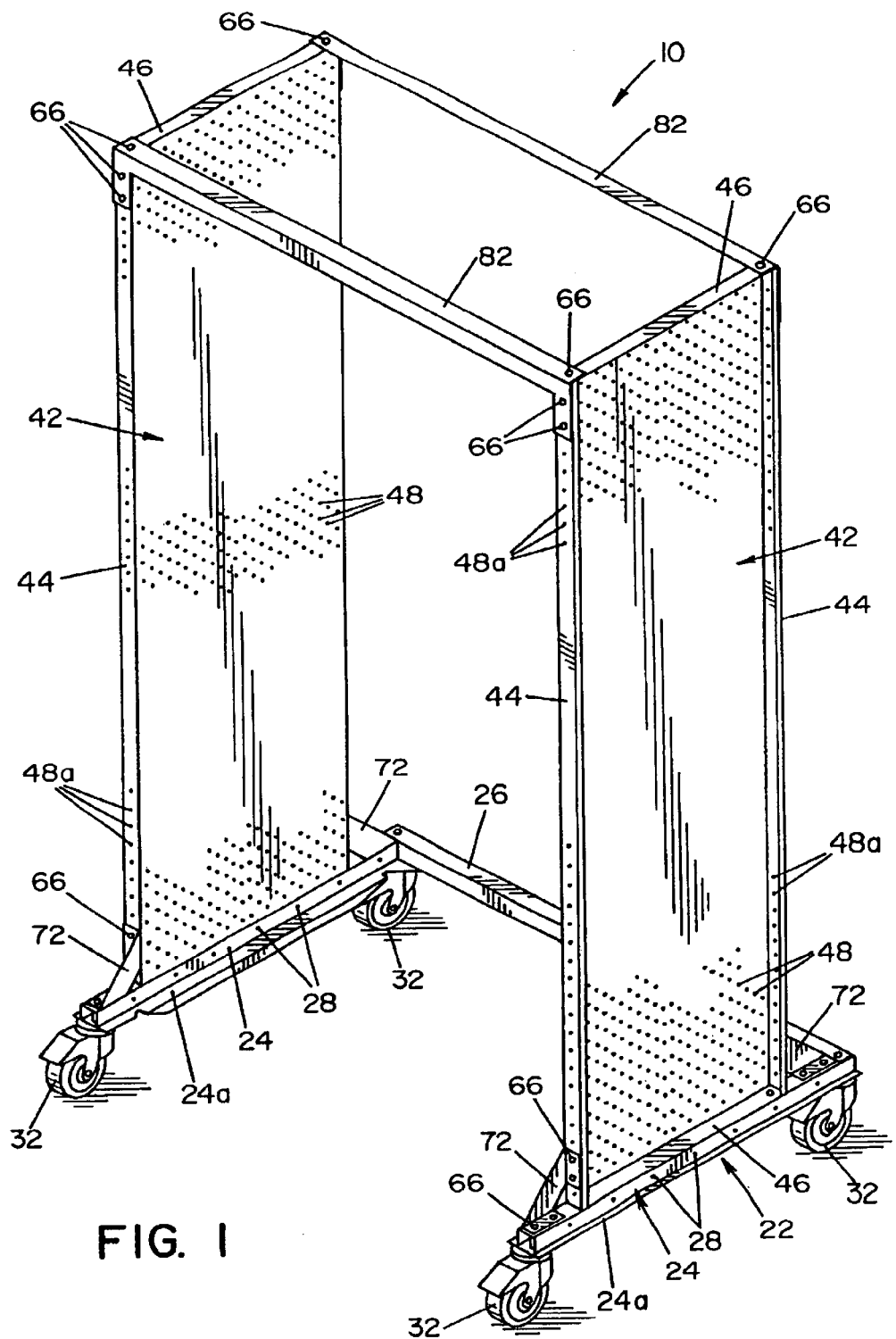
FIG. 1 is a perspective view of a transport cart in its basic form, illustrating a preferred embodiment of the present invention.

Referring now to the drawings wherein the showings are for the purpose of illustrating a preferred embodiment of the invention only, and not for the purpose of limiting same, FIG. 1 shows a transport cart 10 for use in handling cage components used in an animal storage facility, illustrating a preferred embodiment of the present invention. Transport cart 10 is basically a rectangular frame comprised of a generally U-shaped bottom frame 22, a pair of side panels 42 and a pair of top connecting beams 82.

Figure 4:
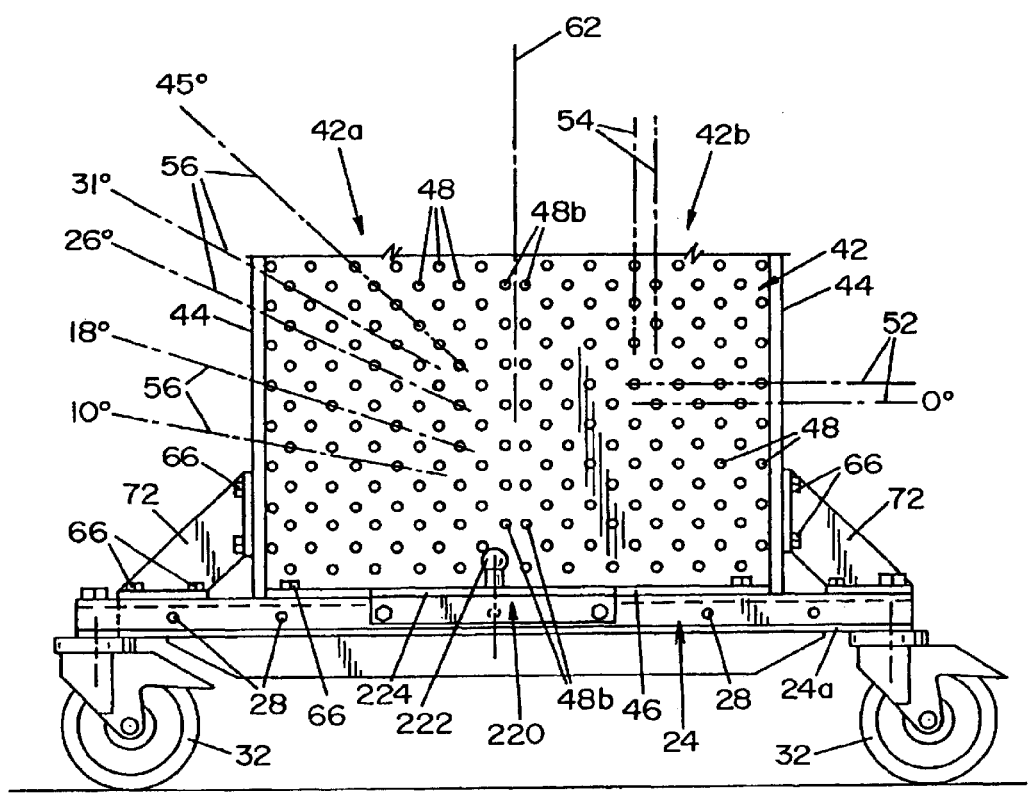
FIG. 4 is an enlarged, elevational view of the lower portion of one side of the transport cart shown in FIG. 1.

In the embodiment shown, bottom frame 22 is comprised of two, spaced-apart side members 24 and a back member 26. Side members 24 may be formed of rectangular tubing, but in the embodiment shown, side members 24 are in the shape of a channel, best seen in FIG. 16, having laterally extending flanges 24a extending from the sides of the channel. Back member 26 is also a channel-shaped structural member. Back member 26 is attached to one end of each side member 24, preferably by welding, to form the generally U-shaped configuration of bottom frame 22. A plurality of spaced-apart, aligned apertures 28 are formed in the sides and top of side members 24, as best seen in FIGS. 1 and 4. Swivel casters 32 are mounted to the lower sides of bottom frame 22 at the four corners thereof.

Two, spaced apart panels 42 are attached to bottom frame 22. Each panel 42 is essentially a mirror image of the other and therefore, only one shall be described in detail. Each panel 42 is rectangular in shape and is formed of a flat sheet material. The lateral edges of the sheet material are bent to one side of the sheet and are shaped to form channel-like, stiffening posts 44, as best seen in FIGS. 6, 8, 10 and 12. The longitudinal ends of panel 42 are also bent to the one side of the sheet to form a flange 46, as best seen in FIG. 1.

Side panels 42 are perforated with a plurality of circular openings 48. Openings 48 are arranged in a predetermined, geometric pattern, wherein some of the openings 48 are aligned horizontally as indicated by phantom lines 52 in FIG. 4, while other openings 48 are aligned vertically, as indicated by phantom lines 54 and still other openings 48 are aligned at different angles relative to horizontal, as indicated by phantom lines 56. As best seen in FIGS. 1 and 8–10, a plurality of openings 48a are aligned along post 44 of panel 42.

In the embodiment shown, openings 48 on one side of a center line 78 are arranged to be a mirror image of the openings 48 on the other side of center line 62, as best seen in FIG. 4. Panels 42 have two regions, 42a, 42b, divided by center line 62. As best seen in FIG. 4, openings 48 on opposites sides of center line 62 are positioned to create pairs of side-by-side openings 48b that are aligned horizontally. In this respect, these pairs of closely spaced, horizontally aligned, side-by-side openings 48b are used as a reference mark, as shall be described in greater detail below.

Panels 42 are attached to side member 24 of bottom frame 22. Panels 42 may be welded to side member 24, but in the embodiment shown, are bolted to side member 24 by conventional fasteners 66 (typically comprised of a bolt 66a and a nut 66b, best seen in FIG. 6) extending through flange 46 in panel 42 and through apertures 28 in side member 26, as illustrated in FIG. 4. Reinforcing brackets 72, as seen in FIG. 4, may also be used to secure panels 42 to side members 24 of bottom frame 22. Again, conventional nut and bolt fasteners 66 extending through apertures 28 on side members 24 and openings 48a in post 44 are utilized to fasten bracket 72 to panel 42 and side member 24.

Figure 13:
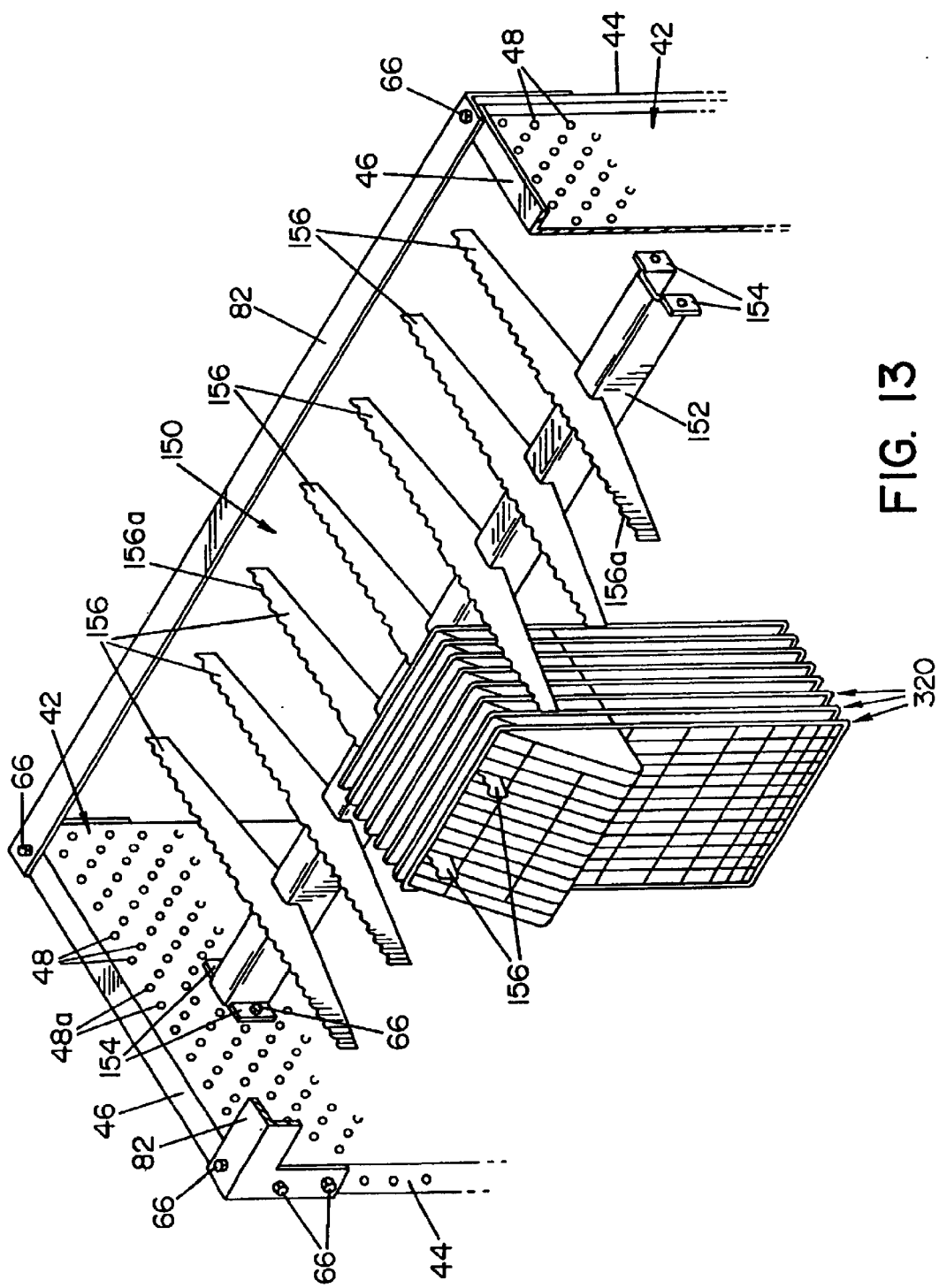
FIG. 13 is a partially-sectioned perspective view showing an interior bracket assembly for supporting cage components, the interior bracket assembly being mounted to opposing side panels of a transport cart.

The upper ends of side panels 42 are fastened together by two horizontal, elongated, connecting beams 82. Connecting beams 82, best seen in FIGS. 1 and 13, are L-shaped in cross-section. Conventional nut and bolt fasteners 66, as heretofore described, are used to fasten connecting beams 82 to post 44 and flange 46 of side panels 42.

Transport cart 10 and the components thereof, as heretofore described, are preferably formed of a material that can withstand high-temperature washing and sterilization processes. Certain plastics and metal may find advantageous application in forming transport cart 10. In a preferred embodiment, transport cart 10 and the respective components forming the same, are formed of a hospital-grade stainless steel. Transport cart 10 is also dimensioned so that it may be placed within most large, industrial washers and sterilizers that are typically found in large animal facilities.

Openings 48 in panels 42, openings 48a in vertical posts 44 and apertures 28 in side members 26 of U-shaped bottom frame 24 are provided to facilitate mounting of a number of different types of "attachments" to transfer cart 10. The attachments are designed to support components that form a conventional animal cage, as shall be described in greater detail below.

The attachments may include, by way of example and not limitation, the following:

wire shelves 110;
pallet rails 120;
support rods 130;
basket hooks 140;
interior bracket assembly 150;
exterior brackets 160; and
L-shaped exterior brackets 170.

As best seen in FIGS. 6–15, the foregoing attachments are mounted to transport cart 10 by conventional fasteners 66 using openings 48 in panels 42, openings 48*a* in posts 44 or apertures 28 in side members 24 of bottom frame 22.

Figure 6:
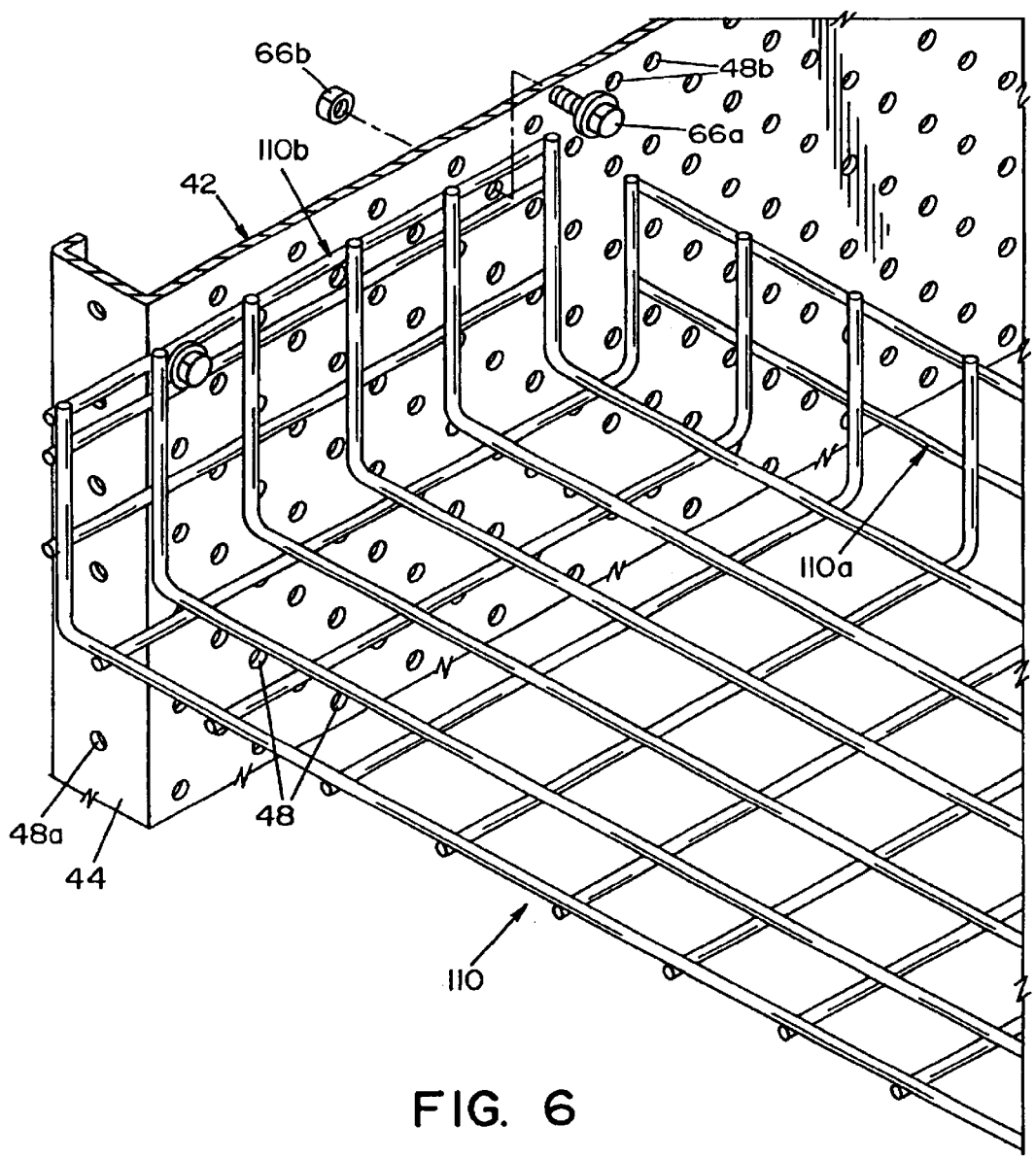
FIG. 6 is an enlarged, perspective view showing how a wire shelf attachment is attached to a side panel of the transport cart shown in FIG. 1.
Figure 7:
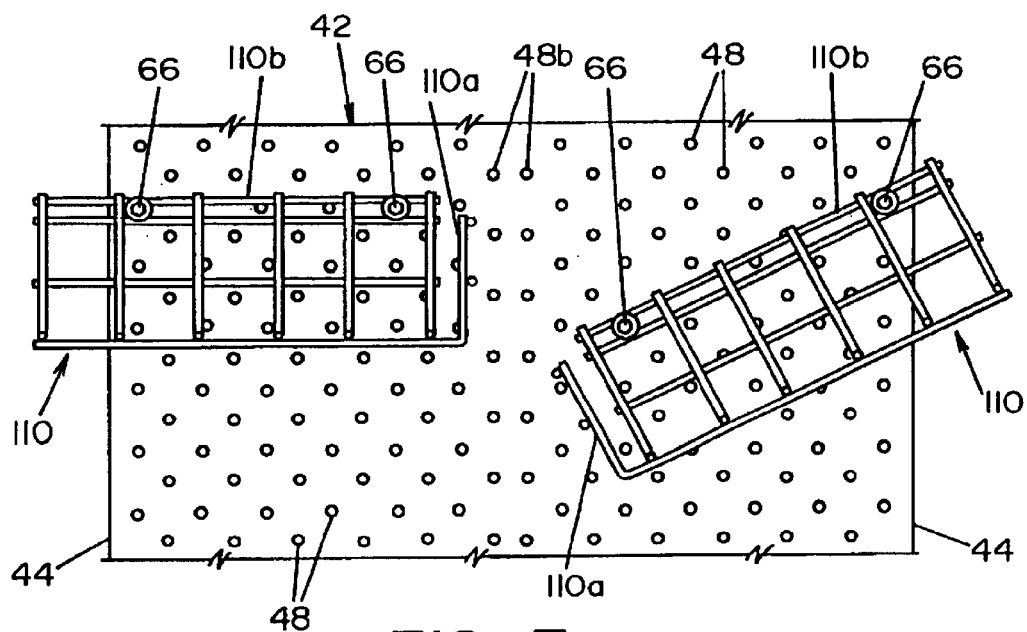
FIG. 7 is a side view showing how a wire shelf attachment may be attached to a side panel of a transport cart in different orientations.

FIG. 6 shows a wire shelf 110 for mounting to panels 42. Shelf 110 is dimensioned to be disposed between side panels 42 of cart 10. Shelf 110 has an upturned back portion 110*a* and upturned side portions 110*b*. Shelf 110 is mounted to side panels 42 by a conventional fastener 66 (a collar screw 66*a* and nut 66*b*) that captures a portion of upturned side portion 110*b*, as shown in FIG. 6. FIG. 7 illustrates how shelf 110 may be positioned in different orientations relative to side panel 42 by using different pairs of openings 48 in side panel 42 for mounting shelf 110. Side-by-side openings 48*b* in panels 42 may be used as reference guides to horizontally align shelf 110 (as well as other attachments) between panels 42.

Figure 8:
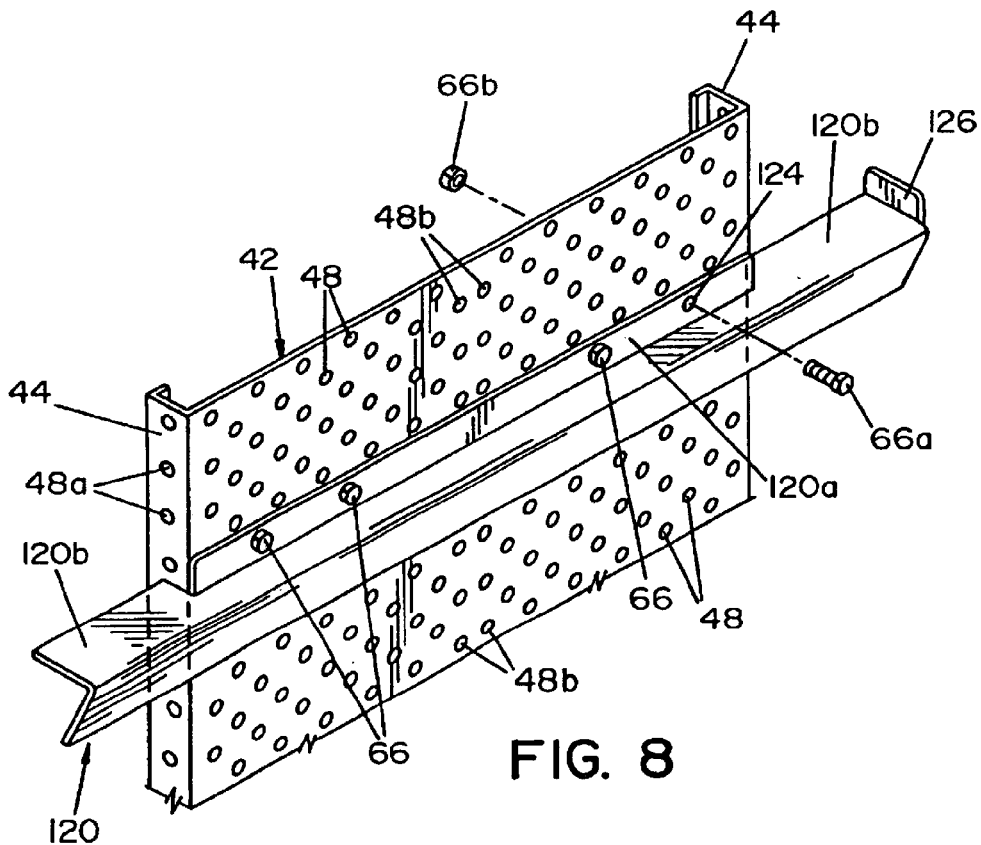
FIG. 8 is a perspective view of a pallet rail attachment attached to a side panel of a transport cart.
Figure 9:
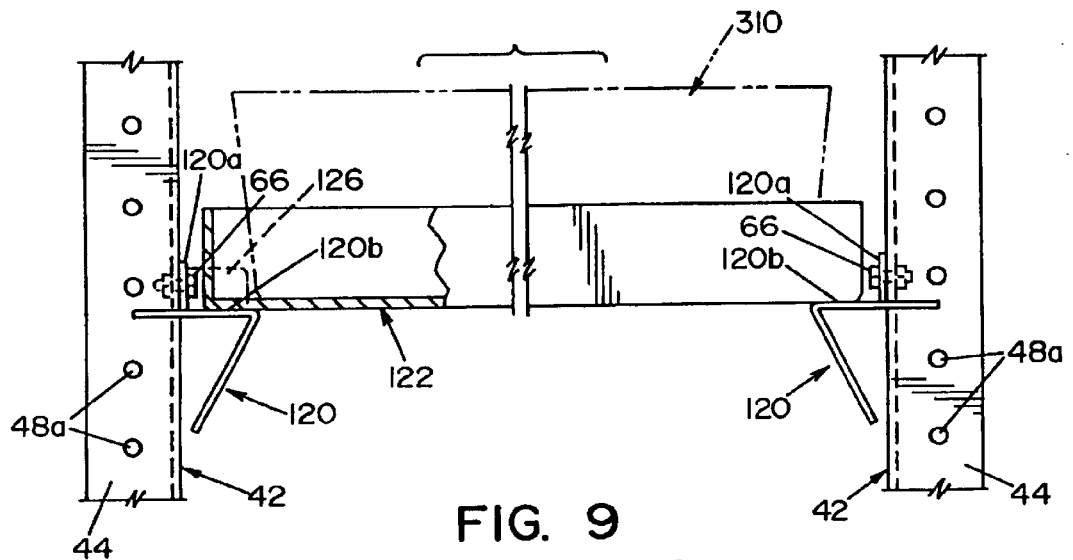
FIG. 9 is a front, elevational view showing pallet rail attachments mounted to opposing side panels of a transport cart for supporting a pallet that in turn supports cage components.

FIG. 8 shows a pallet rail 120 attached to panel 42. Pallet rail 120 is dimensioned to support a pallet (designated 122 in FIG. 9) that in turn supports plastic tray components (shown in phantom in FIG. 9) of an animal cage. Pallet rail 120 is basically an elongated member that is essentially L-shaped in cross-section. Pallet rail 120 is dimensioned to be longer than the width of panel 42. Pallet rail 120 includes a mounting flange 120*a* having holes 124 formed therein that are dimensioned to mate with openings 48 in side panels 42. Pallet rail 120 is attached to side panel 42 by conventional fasteners 66, as shown in FIG. 8. When mounted to side panel 42, pallet rail 120 defines a horizontal support surface 120*b*, on which a pallet 122 may rest, as shown in FIG. 9. A stop 126, best seen in FIG. 8, is formed at one end of pallet rail 120.

Figure 10:
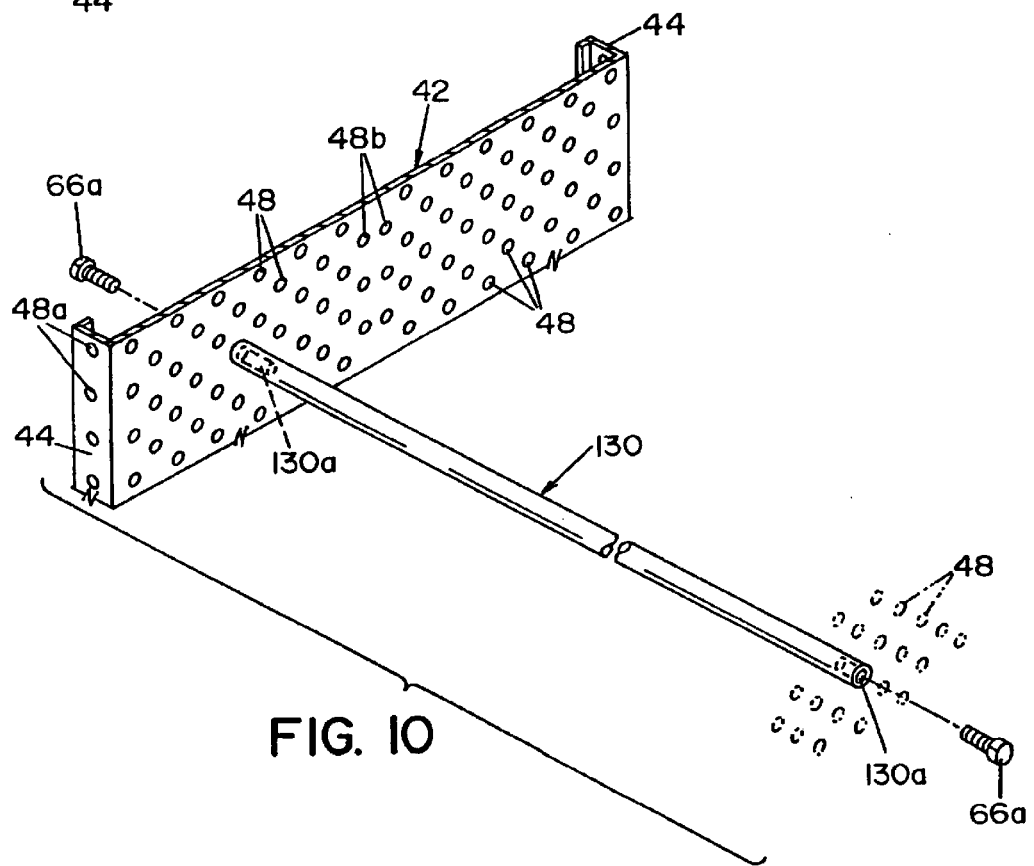
FIG. 10 is a perspective view showing a support rod attachment that is attached to side panels of a transport cart.
Figure 11:
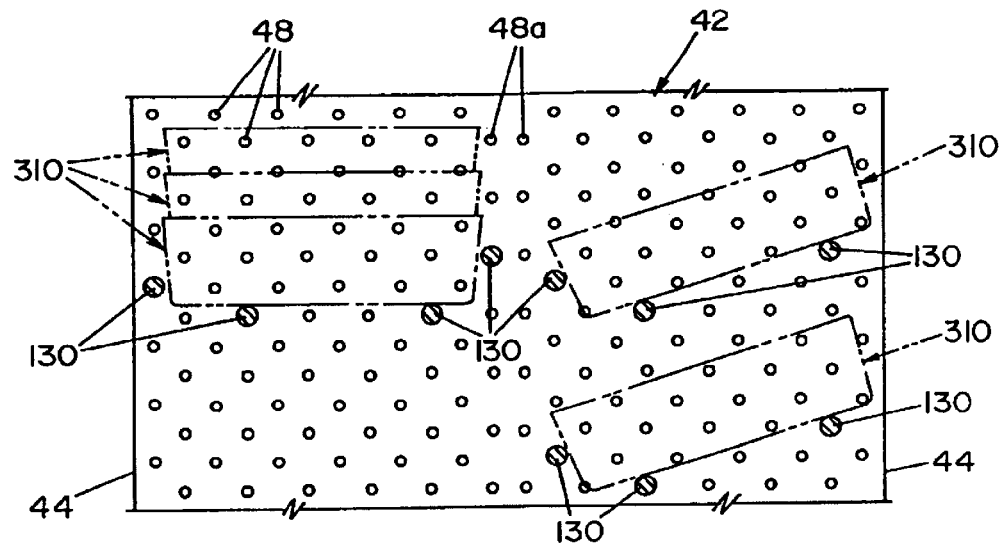
FIG. 11 is a side elevational view showing how support rod attachments may be arranged on a side panel to support cage components in different orientations.

FIG. 10 shows support rods 130 mounted to a side panel 42 and spanning the opening therebetween. Rod 130 is basically an elongated, cylindrical rod having internally threaded ends 130*a*. Rod 130 is dimensioned to extend between side panels 42. Conventional threaded bolts 66*a* secure support rods 130 in place between side panels 42. FIG. 11 shows how a plurality of support rods 130 may be mounted to side panel(s) 42 at different locations thereon, to support cage components (shown in phantom in FIG. 11) in different orientations thereon.

Figure 12:
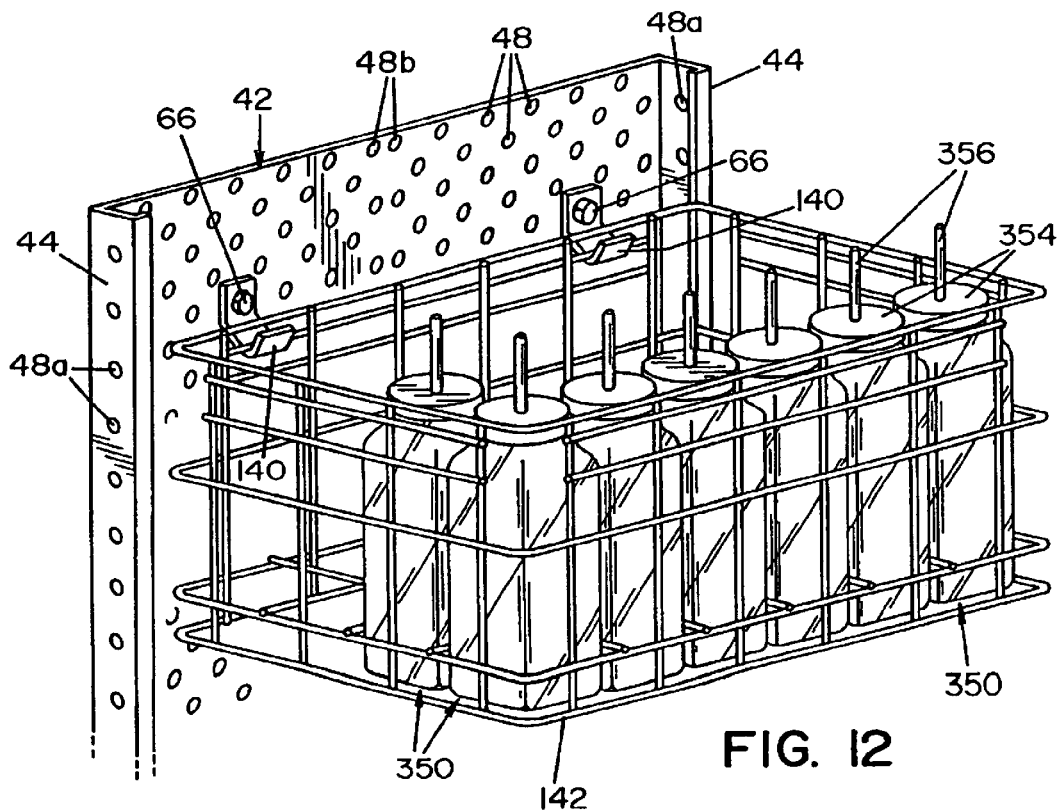
FIG. 12 is a perspective view showing a basket containing water bottles that is supported on a transport cart by basket hook attachments mounted to a side panel.

FIG. 12 shows basket hooks 140 mounted to the outer surfaces of a side panel 42 by fasteners 66. Basket hooks 140 are basically J-shaped strips dimensioned to support a wire basket 142. Basket 142 is rectangular in shape and is dimensioned to support cage components, such as water bottles, as shown in the drawings.

FIG. 13 illustrates an interior bracket assembly 150 that is dimensioned to be disposed between side panels 42. Interior bracket assembly 150 is basically comprised of an elongated channel 152 having mounting flanges 154 at the distal ends thereof for mounting channel 152 to side panels 42 by means of fasteners 66. A plurality of spaced-apart brackets 156 are fixedly mounted to channel 152, such that brackets 156 extend transversely to the axis of channel 152. As illustrated in the drawings, the upper edge 156*a* of brackets 156 includes a plurality of notches dimensioned to receive wire separators, as illustrated in the drawings.

Figure 14:
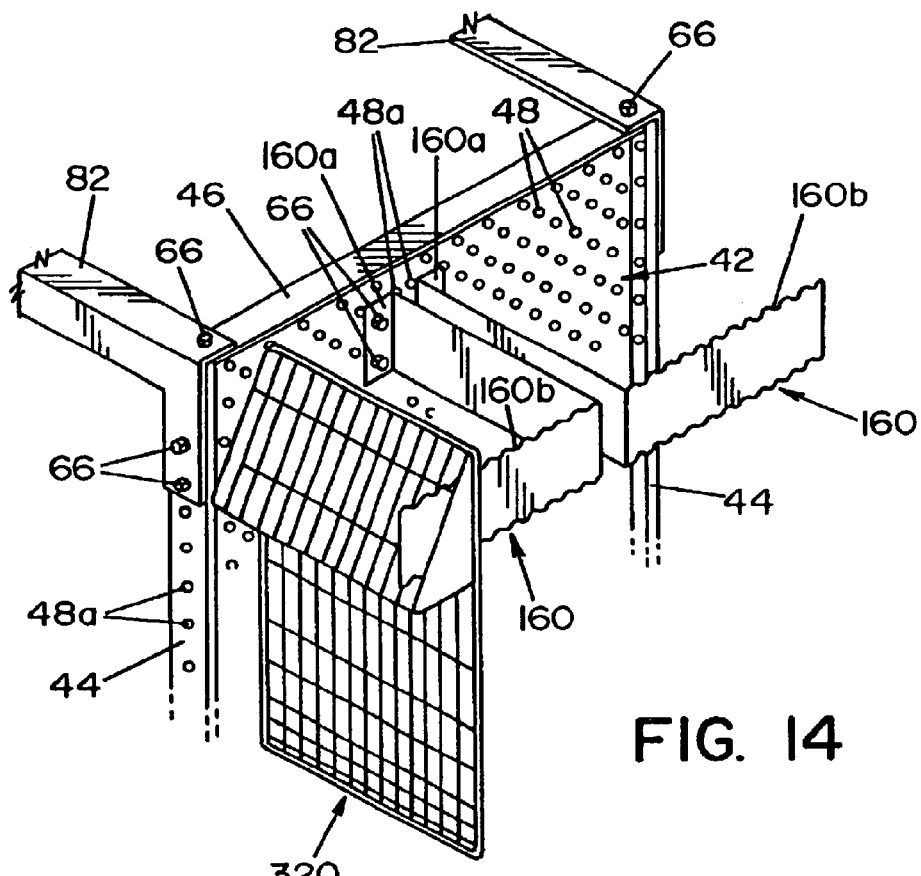
FIG. 14 is a perspective view of a portion of a side panel of a transport cart showing an L-shaped exterior bracket attachment mounted thereto for supporting a cage component.

FIG. 14 shows a pair of L-shaped brackets 160 for mounting to a side panel 42 to support a cage component. Each L-shaped bracket 160 is identical to the other, and therefore only one shall be described in detail. Bracket 160 is basically an elongated, rectangular strip that is formed into an L-shape. A mounting flange 160*a* is formed at one end of bracket 160 for mounting to side panel 42 by fasteners 66. Edges 160*b* of bracket 160 include a plurality of notches dimensioned to receive a wire cage component as shown in FIG. 14.

Figure 15:
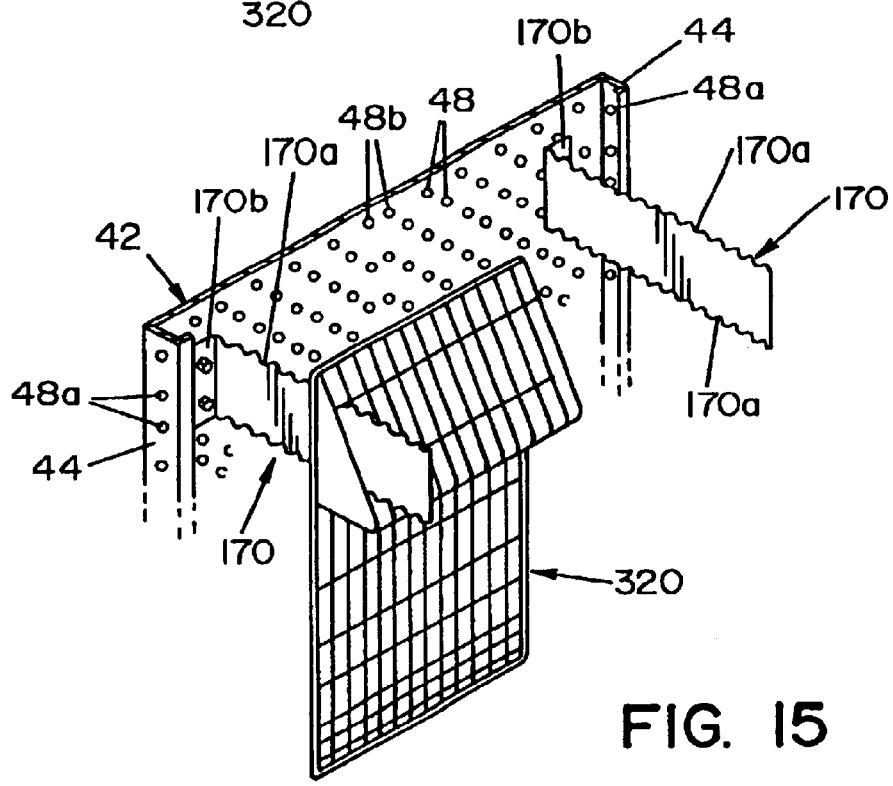
FIG. 15 is a partially-sectioned perspective view showing an exterior bracket attachment mounted to a side panel of a transport cart for supporting cage components.

FIG. 15 shows a straight bracket 170, similar to bracket 160, for supporting a wire cage component. Bracket 170 is essentially a flat, rectangular member with edges 170*a* having a plurality of notches dimensioned to receive the aforementioned wire cage components. One end of bracket 170 is bent to define a mounting flange 170*b*, for mounting bracket 170 to side panel 42.

In addition to the foregoing attachments 110–170 for supporting cage components, cart 10 may also support fixtures to facilitate handling, movement and storage of cart 10. By way of example and not limitation, such fixtures may include:

a handlebar assembly 210,
male and female coupling devices 220 and 230, and
curtain rod assembly 240.

Figure 3:
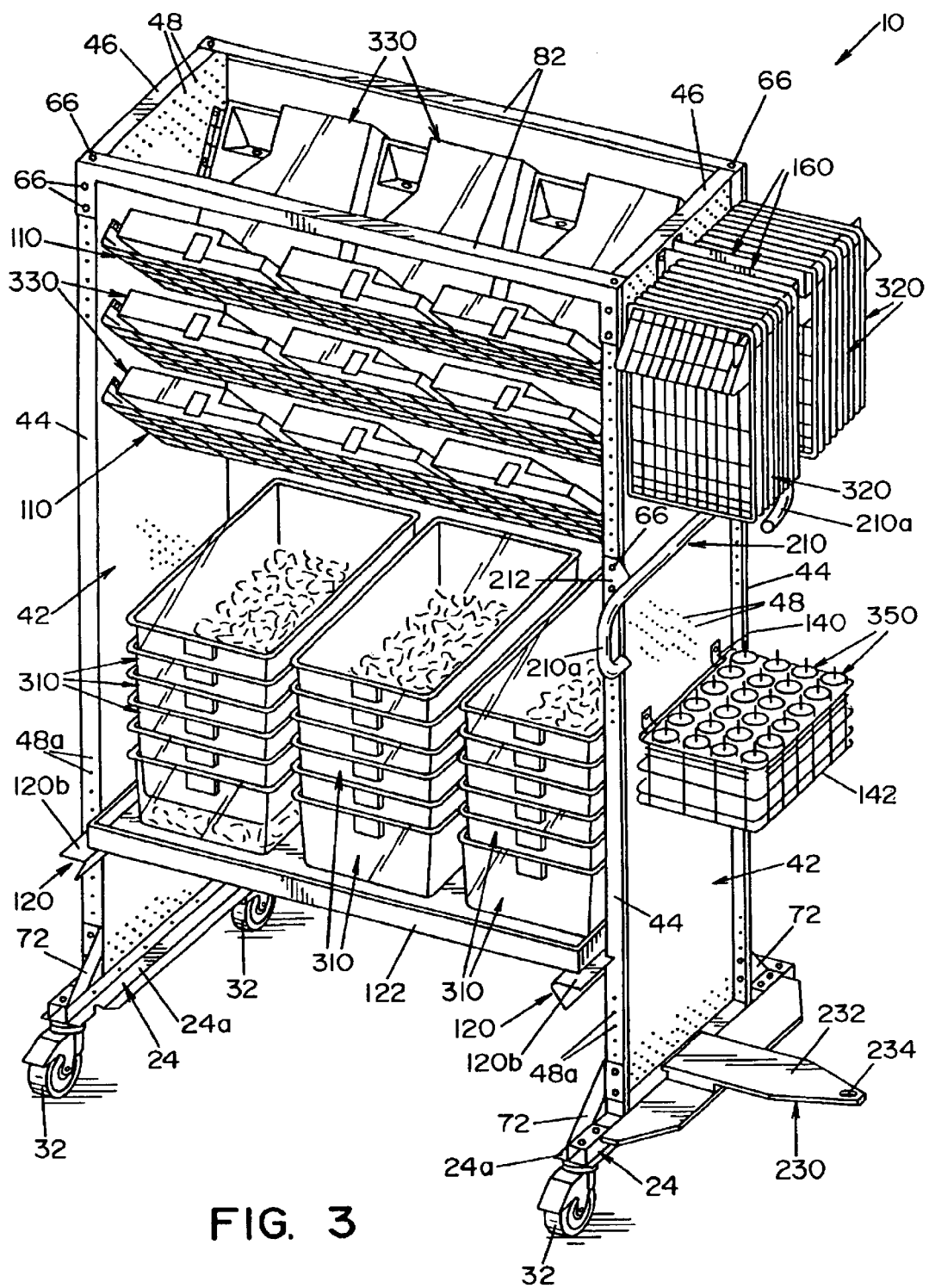
FIG. 3 is a perspective view of a transport cart as shown in FIG. 1, having attachments mounted thereto supporting various cage components.

Handlebar assembly 210, best seen in FIG. 3, is basically an elongated bar with J-shaped ends 210*a* having spaced-apart mounting brackets 212 for attaching handle assembly 210 to vertical posts 44 by conventional fasteners 66.

Figure 16:
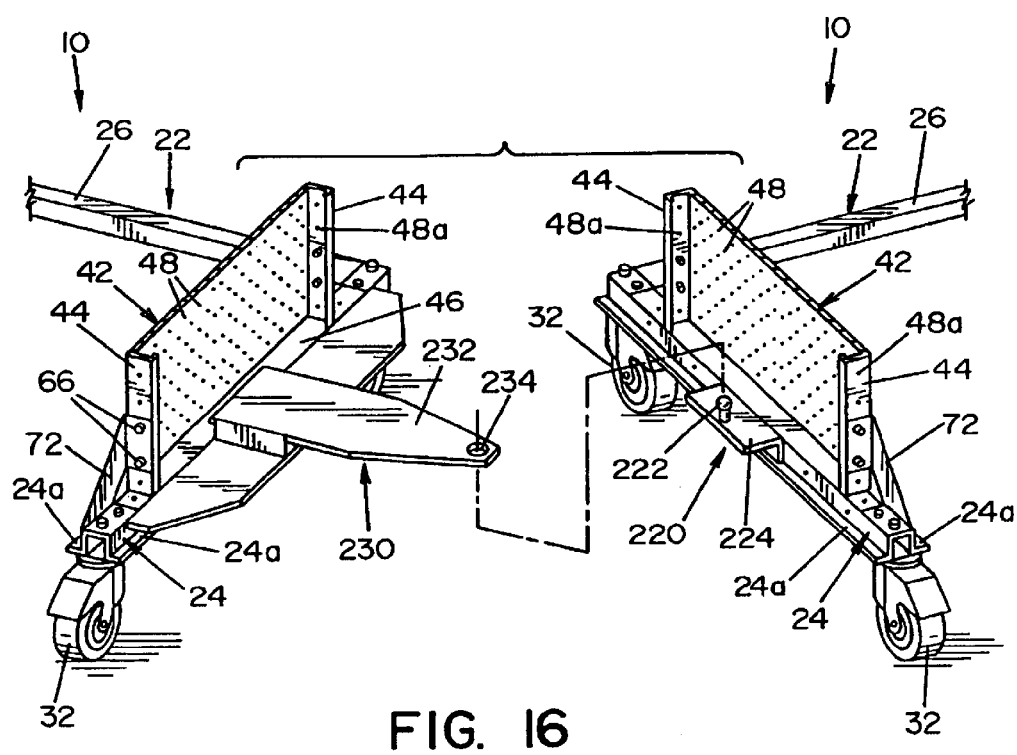
FIG. 16 is a perspective view showing the lower portions of two transport carts, one transport cart having a female attachment and the other transport cart having a male attachment for connecting the transport carts together.

Male and female coupling devices 220, 230 are best seen in FIG. 16. Female coupling device 230 is basically comprised of a plate 232 extending from one side of cart 10 having an aperture 234 therein. Female coupling device 230 is attached to cart 10 to connect with a male coupling device 220 on a separate cart 10. Male coupling device 220 is essentially comprised of a pin 222 that is secured to an L-shaped clip 224 that is secured to side member 24 of U-shaped bottom frame 22.

Figure 17:
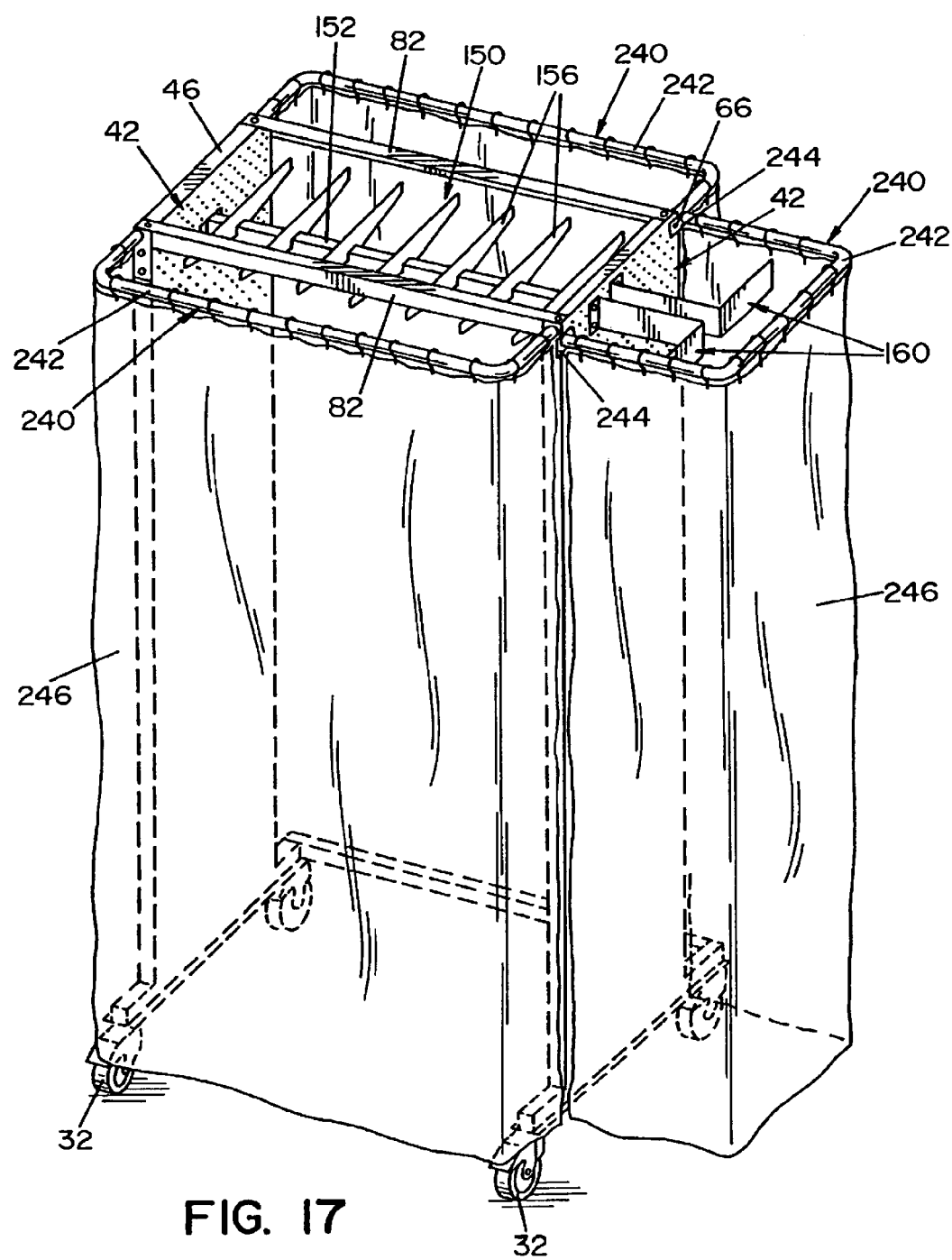
FIG. 17 shows a transport cart as shown in FIG. 1 having curtain rods mounted thereto supporting curtains that surround cage components stored on the transport cart.

Curtain rod assemblies 240, best seen in FIG. 17, are essentially U-shaped bars 242 having mounting brackets 244 attached thereto. Mounting brackets 244 are attached to vertical posts 44 by fasteners 66. Curtains 246 hang from bars 242.

Figure 2:
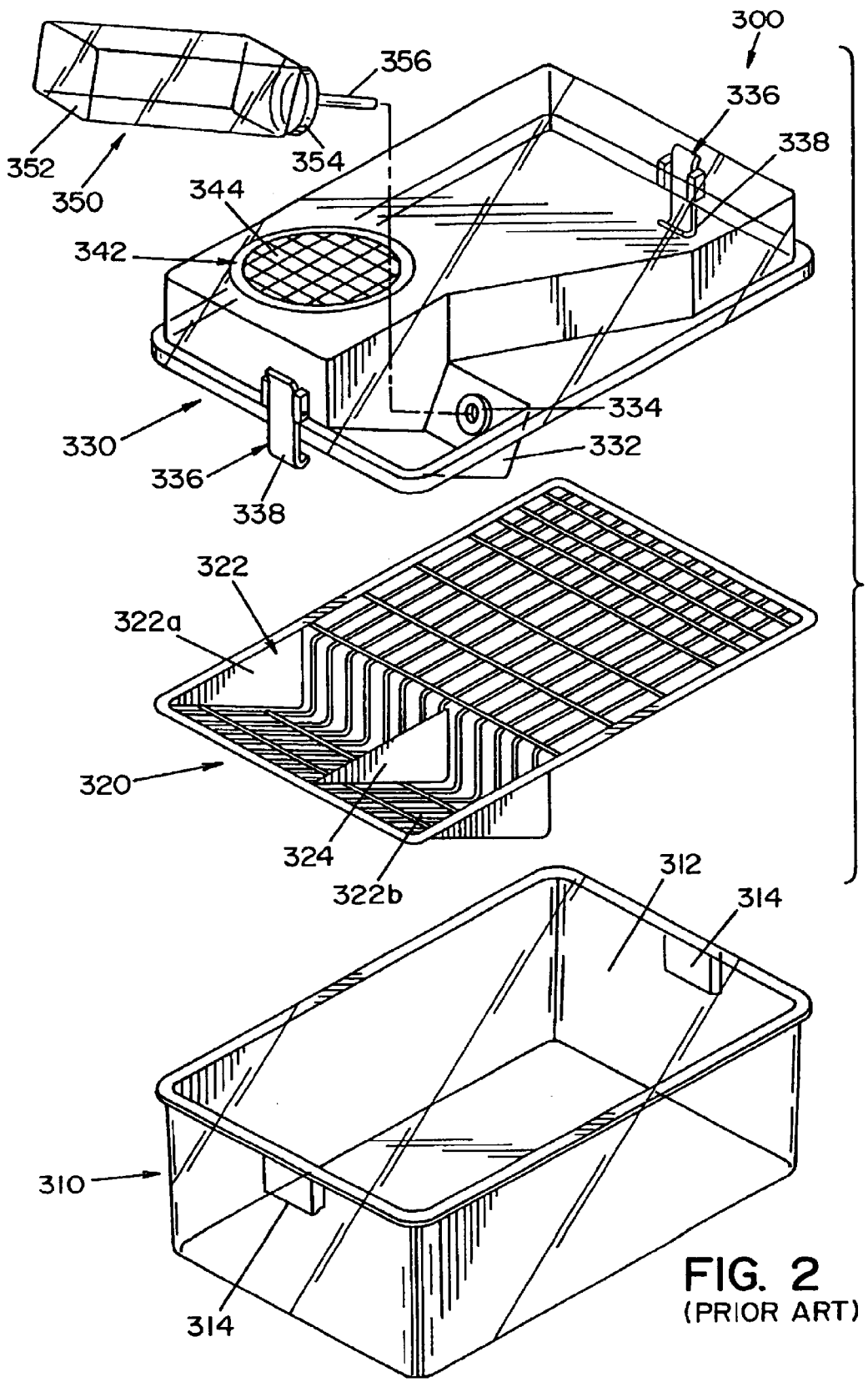
FIG. 2 is an exploded view of a conventional cage used for housing small animals, showing the various components thereof.

As indicated above, transfer cart 10 is adapted for use in handling components of animal cages that are used in large animal facilities. Referring now to FIG. 2, a conventional animal cage 300 of the type typically used in animal storage facilities is shown in exploded view. Cage 300 is described to facilitate an understanding of the present invention. However, cage 300, in and of itself, forms no part of the present invention. Cage 300 is generally comprised of tray 310, a separator screen 320, a cover 330 and a water bottle 350.

Tray 310 is rectangular in shape and is typically formed of a molded, clear plastic. Tray 310 defines an inner chamber 312 that is dimensioned to house small animals. Tray 310 includes recesses 314 molded into opposite ends thereof to receive a latch member, as shall be described in greater detail below.

Separator screen 320 is a metal, wire screen dimensioned to rest upon the upper edge of tray 310, and to confine an animal within chamber 312 of tray 310. One end of separator screen 320 is shaped to define a recessed portion 322 that projects into tray 310 when separator screen 320 is set thereupon. A panel 324 separates recessed portion 322 into two recessed portions 322a, 322b. Recessed portion 322a is dimensioned to receive food for the animal in particle form, and recessed portion 322b is dimensioned to receive water bottle 350.

Cover 330 includes a molded portion 332 that is dimensioned to be positioned within recessed portion 322b of separator screen 320. Molded portion 332 includes a grommet 334. Latches 336 are provided at opposite ends of cover 330. Each latch 336 includes a latch member 338 that is dimensioned to be received within recesses 314 of tray 310. In this respect, cover 330 is dimensioned to be positioned over tray 310 and to be secured thereto by latch members 338 being received within recesses 314 of tray 310. Cover 330 further includes an open area 342 having a filter 344 therein. Filter 344 provides filtered, clean air to an animal within cage 300 when the respective parts thereof are assembled.

Water bottle 350 basically includes a bottle section 352 and a cap section 354. Cap section 354 includes a sipping tube 356 that communicates with the interior of bottle 350.

Cage 300 is designed to house one or more animals, such as mice or hamsters. Bedding material (not shown) is placed within chamber 312 of tray 310. One or more animals, such as mice or hamsters, are placed within tray 310 and separator screen 320 is placed thereover. Dry food in large particle form is then placed within recessed portions 322a of separator screen 320. Cover portion 330 is then placed thereover onto tray 310 and secured thereto by latch assemblies. Sipping tube 356 of water bottle 350 is inserted through grommet 334 in cover 330 and through the separator screen 320 so as to be positioned with the end thereof within tray 310 to be accessible by the animals therein.

Referring now to the operation of the present invention, FIG. 3 shows a transfer cart 10 loaded with cage components as heretofore described. Cart 10 in FIG. 3 is shown with clean cage components thereon. Specifically, clean cage tray 310 with bedding material therein is stacked on a pallet 122 that is supported by pallet rails 120. Covers 330 are supported on wire shelves 110. Separator screens 320 are hung on L-shaped brackets 160 that are attached to one side panel 42. A basket 142 contains filled water bottles 350. Cart 10 thus provides all the components needed to assemble clean cages 300.

Figure 5:
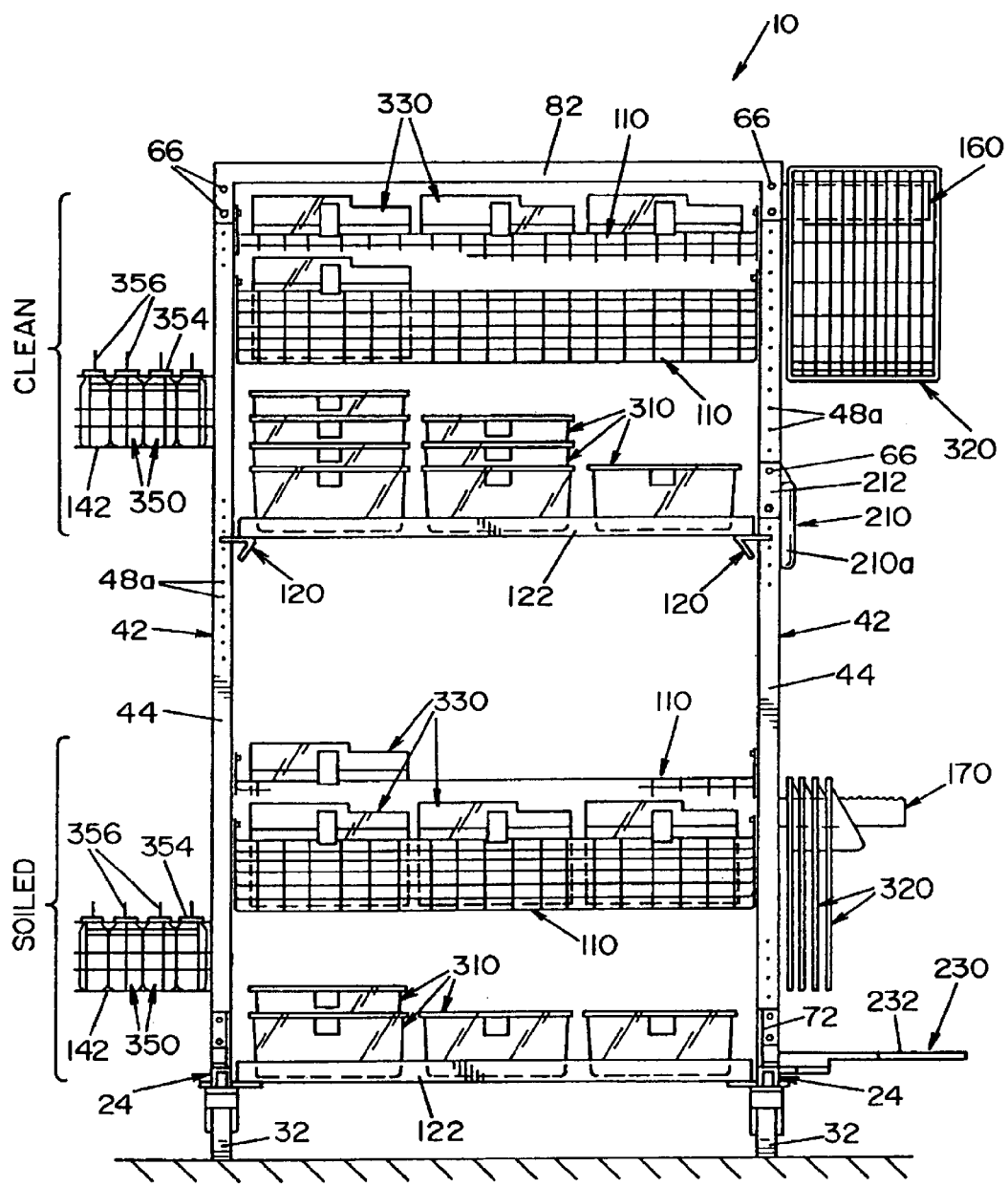
FIG. 5 is a front elevational view of a transport cart as shown in FIG. 1, wherein the transport cart is arranged with attachments to support "clean" cage components and "soiled" cage components.

Cart 10, with the clean components thereon, would be moved into a room where animals are stored. On a work table, or bench, a clean cage 300 would be assembled by a worker using the clean cage components on cart 10. The animal(s) would then be transferred from the dirty cage to the clean cage and returned to their normal location. The dirty cage is disassembled by the worker and the dirty cage components are arranged and stacked onto a second cart 10 (not shown). The second cart 10 is preferably arranged with a pallet 122, wire shelves 110, wire basket 142 and brackets 160, to receive the dirty cage components thereon. When all the clean cage components on the original cart 10 are assembled and used, and all of the dirty cage components are placed onto the second cart, the second cart 10, with the dirty cage components thereon, is removed from the animal storage room and is taken to a location where the dirty cage components are cleaned. The original cart 10, that is now empty, may remain in the animal storage room. The next time it is necessary to change cages 300, the empty cart 10 may be used to receive the dirty cage components and to then transfer the dirty cage components to a washing area. FIG. 5 illustrates a cart 10 that has been designed to transport both clean cage components (to an animal storage room for assembly and use), and soiled cage components (that are replaced by the clean cages).

Referring now to washing and sterilizing dirty cage components in large animal facilities, it is known to utilize automated systems. U.S. Pat. No. 6,394,033, the disclosure of which is expressly incorporated herein by reference, discloses a system for removing and refilling animal cages. The system utilizes robotics to dump and refill the bedding in the cage components. Cart 10 is particularly applicable for use with such automated systems. With cart 10 loaded as illustrated in FIG. 3 and positioned at a specific location relative to a robotic device, the individual components may be grasped from their positions on cart 10 by the robotic device and transferred from cart 10 to a system handling device (not shown). In other words, cart 10 and the support attachment thereon, may be designed to position the cage components for removal and handling by a robotic system when cart 10 is positioned adjacent to the robotic system. In similar respects, a robotic system may place cage components onto a cart 10. Thus, a transport cart 10, according to the present invention, finds advantageous application with robotic systems for removing and/or refilling cage components.

Cart 10 also facilitates washing dirty cage components. In this respect, a cart 10 loaded with dirty cage components (after bedding and liquids have been removed therefrom) may be placed within conventional washers and sterilizers for cleaning and sterilizing. Cart 10 is dimensioned to fit within most conventional washers and sterilizers used in large animal facilities. Cart 10 can be washed and sterilized together with the cage components thereon.

Cart 10 thus provides a useful device for storing and transporting cage components for use in large or small animal facilities. Cart 10 also provides a device that may advantageously be used with robotic systems and industrial washers typically found in large animal facilities.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A portable cart for organizing, supporting and transporting articles, said cart having a generally rectangular, open frame structure, comprised of:
   a plurality of elongated structural members having apertures formed therein;
   two planar, spaced-apart panels that are parallel to each other, and that have a plurality of apertures formed therethrough, each of said panels being formed from a flat, rectangular sheet of perforated metal, said rectangular sheet having lateral sides that are bent to one side and formed into a generally C-shaped channel and longitudinal ends that are bent to said one side to form a flange;
   one or more support elements mounted to said panels using said apertures in said panels, said support elements dimensioned to support articles on said cart; and
   coasters at corners of said frame member to allow rolling movement of said cart.

2. A portable cart as defined in claim 1, wherein said support elements are adapted to support components of animal cages.

3. A portable cart as defined in claim 1, wherein said cart is formed of a medical-grade material.

4. A portable cart as defined in claim 3, wherein said material is metal.

5. A portable cart as defined in claim 4, wherein said metal is stainless steel.

6. A portable cart as defined in claim 3, wherein said material is plastic.

7. A portable cart as defined in claim 1, wherein said support elements are comprised of a plurality of elongated rods attached to and extending between said panels and attached to said apertures, said rods defining article support areas within said frame structure.

8. A portable cart as defined in claim 1, wherein said support element is comprised of a wire shelf.

9. A portable cart as defined in claim 1, wherein said support element is comprised of an elongated pallet rail.

10. A portable cart as defined in claim 1, wherein said support element is comprised of a hook for supporting a wire basket.

11. A portable cart as defined in claim 1, wherein said support element is a bracket formed of a generally rectangular, flat strip that is oriented to be on edge.

12. A portable cart as defined in claim 11, wherein said strip is L-shaped.

13. A portable cart as defined in claim 1, wherein said support element is comprised of: an elongated beam spanning said spaced-apart side panels, and a plurality of generally flat, planar brackets mounted to said beam, wherein said brackets are on edge and perpendicular to said beam.

14. A portable cart as defined in claim 1, wherein said apertures in said panels are arranged such that some of said apertures are vertically aligned, some of said apertures are horizontally aligned and some of said apertures are aligned at an angle relative to horizontal.

* * * * *